United States Patent
Purdy et al.

(10) Patent No.: US 11,046,588 B2
(45) Date of Patent: *Jun. 29, 2021

(54) SYNTHETIC CAUSTIC COMPOSITION

(71) Applicant: FLUID ENERGY GROUP LTD., Calgary (CA)

(72) Inventors: Clay Purdy, Medicine Hat (CA); Markus Weissenberger, Calgary (CA)

(73) Assignee: FLUID ENERGY GROUP LTD., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,541

(22) Filed: Nov. 13, 2018

(65) Prior Publication Data

US 2019/0144293 A1    May 16, 2019

(30) Foreign Application Priority Data

Nov. 15, 2017  (CA) ..................... 2985622

(51) Int. Cl.
| | | |
|---|---|---|
| C01D 1/04 | (2006.01) |
| C09K 8/68 | (2006.01) |
| C09K 8/70 | (2006.01) |
| C09K 8/74 | (2006.01) |
| C10G 1/04 | (2006.01) |
| C09K 8/66 | (2006.01) |
| C10G 19/067 | (2006.01) |
| C09K 8/80 | (2006.01) |
| E21B 43/267 | (2006.01) |

(52) U.S. Cl.
CPC ............... *C01D 1/04* (2013.01); *C09K 8/665* (2013.01); *C09K 8/685* (2013.01); *C09K 8/70* (2013.01); *C09K 8/74* (2013.01); *C09K 8/80* (2013.01); *C10G 1/04* (2013.01); *C10G 19/067* (2013.01); *E21B 43/267* (2013.01)

(58) Field of Classification Search
CPC . C09K 8/685; C09K 8/70; C09K 8/74; C01D 1/04
See application file for complete search history.

(56) References Cited

U.S. PATENT DOCUMENTS

| | | | |
|---|---|---|---|
| H468 H | 5/1988 | Malik et al. | |
| 4,830,716 A * | 5/1989 | Ashmead ............... | C07C 51/41 205/457 |
| 4,976,315 A | 12/1990 | Prukop | |
| 5,804,541 A | 9/1998 | Jans | |
| 6,387,864 B1 | 5/2002 | Bartelme | |
| 7,073,519 B2 | 7/2006 | Choi et al. | |

(Continued)

OTHER PUBLICATIONS

Official Action for U.S. Appl. No. 16/189,568, dated Mar. 24, 2020 8 pages Restriction Requirement.

(Continued)

*Primary Examiner* — Angela M DiTrani Leff
(74) *Attorney, Agent, or Firm* — Sheridan Ross P.C.

(57) ABSTRACT

An aqueous caustic composition comprising: a caustic component; an amino acid additive adapted to provide an extended buffering effect to the caustic composition when such is exposed to an acid; and water, wherein the caustic component and the amino acid additive are present in a molar ratio ranging from 15:1 to 5:1. Methods of using such compositions are also disclosed.

20 Claims, 6 Drawing Sheets

(56) References Cited

U.S. PATENT DOCUMENTS

| | | | |
|---|---|---|---|
| 7,084,093 B2* | 8/2006 | Crews | C09K 8/68 |
| | | | 507/209 |
| 7,902,137 B2 | 3/2011 | Kneipp et al. | |
| 9,399,589 B2 | 7/2016 | MacDonald | |
| 9,441,129 B2 | 9/2016 | Katoh et al. | |
| 10,913,890 B2* | 2/2021 | Purdy | C10G 19/02 |
| 2004/0022792 A1* | 2/2004 | Klinke | A61K 47/183 |
| | | | 424/178.1 |
| 2009/0031775 A1* | 2/2009 | Bevans | C05F 5/002 |
| | | | 71/23 |
| 2011/0256085 A1 | 10/2011 | Talingting Pabalan et al. | |
| 2013/0324443 A1 | 12/2013 | Wang et al. | |
| 2014/0166586 A1* | 6/2014 | Sikes | C08L 77/04 |
| | | | 210/708 |
| 2015/0183669 A1 | 7/2015 | MacDonald | |
| 2017/0204316 A1 | 7/2017 | Pop et al. | |
| 2018/0127633 A1 | 5/2018 | Burakowska et al. | |
| 2019/0144739 A1 | 5/2019 | Purdy et al. | |
| 2019/0144740 A1 | 5/2019 | Purdy et al. | |
| 2019/0144741 A1 | 5/2019 | Purdy et al. | |

OTHER PUBLICATIONS

Official Action for U.S. Appl. No. 16/189,568, dated Jun. 12, 2020 10 pages.

Notice of Allowance for U.S. Appl. No. 16/189,568, dated Oct. 5, 2020 10 pages.

Official Action for U.S. Appl. No. 16/189,611, dated Mar. 17, 2020 10 pages Restriction Requirement.

Official Action for U.S. Appl. No. 16/189,611, dated Mar. 24, 2020 9 pages Restriction Requirement.

Official Action for U.S. Appl. No. 16/189,611, dated Jun. 15, 2020 12 pages.

Notice of Allowance for U.S. Appl. No. 16/189,611, dated Nov. 16, 2020 5 pages.

Official Action for U.S. Appl. No. 16/189,589, dated Mar. 19, 2021 15 pages.

* cited by examiner

SYNTHETIC CAUSTIC COMPOSITION

CROSS-REFERENCE TO RELATED APPLICATION

This application claims the benefit of Canadian Patent Application No. 2,985,622, filed Nov. 15, 2017, the entire contents of which are incorporated herein by reference in its entirety.

FIELD OF THE INVENTION

The present invention is directed to a novel synthetic caustic composition, more specifically a novel composition comprising a caustic component and an additive adapted to provide an extended and linear buffering effect.

BACKGROUND OF THE INVENTION

Caustic compositions have a wide variety of uses in the oil and gas industry. They can be used for pH control in aqueous solutions as well as to control alkalinity. Caustic compositions also find other varied uses which includes, among others, breaking down of organic matter and removing various impurities in the refining stage of petroleum production. The impurities it can be most effectively used to remove include carbon dioxide and various sulfur-containing compounds. Removal of sulfur-containing compounds is also referred to in the industry as sweetening the petroleum. Some hydroxides can be highly hazardous materials to handle because they are very hygroscopic and typically have a high exothermic reaction with other fluids, especially low pH fluids. Sodium hydroxide is soluble in water, ethanol and methanol. These solutions can cause severe, irreversible dermal/ocular burns. Sodium hydroxide may cause chemical conjunctivitis and corneal damage. Severe eye burns with clouding of the surface, and ensuing blindness may occur from exposure to liquid sodium hydroxide. Low concentration levels of mists or aerosols cause burning discomfort, spasmodic blinking or involuntary closing of the eyelids, redness, and tearing. At room temperature sodium hydroxide is a white crystalline, odorless, deliquescent solid, which absorbs moisture from the air. When sodium hydroxide is dissolved in water, often a mist is formed. Sodium hydroxide itself is nonflammable, but in contact with moisture it may ignite combustibles. Toxic fumes may be formed upon heating. The solid, solutions, mists, and aerosols are all corrosive.

Sodium hydroxide (widely utilized) is available commercially in a solid (sodium hydroxide is most commonly sold as flakes, prills, and cast blocks) or a liquid solution (normally a 50% strength). Typically, in an oil & gas drilling application a solid bead or flake is added to a mixing barrel with water until solubilized and then added to the mud system or fluid system to increase the pH for various reasons, such as to limit the precipitation of calcium and magnesium from a hard water source, limit the incompatibility of the fluid system with formation clays/shales and reduce swelling. Another advantage of a liquid sodium hydroxide is the absorption of hydrogen sulfide and carbon dioxide gases from a fluid system. Having an alternative product that is lower-hazard and more environmentally responsible is advantageous due to the high level of human exposure, and the fact that drill cuttings (that have residuals of the mud system) are often spread over agricultural fields as a disposal technique.

A 25 to 50% sodium hydroxide solution is widely utilized in the bitumen extraction process with relation to oil-sands development. Most commercial mineable oil sands producers use an extraction method "Clarks Hot Water Extraction" process which was developed in the 1920s. One of the major operational disadvantages of a 50% sodium hydroxide solution is that it begins to freeze at 14 degrees Celsius and a 25% solution will freeze at −17 Celsius. It is therefore advantageous to have a product with a much lower freeze point, as low as −45 Celsius. As the waste fluids are intentional or unintentionally released into the environment post treatment, having a product that is more environmentally responsible, low-toxicity and lower-hazard to handle is highly advantageous. Volumes in excess of 200,000 gallons/day are utilized in the Canadian Oil Sands, and the technical and environmental advantages for a product with these constituents are substantial.

Alkaline Surfactant Polymer (ASP) flood applications utilize a high pH fluid to aid in reservoir recovery. Having a product that is non-hazardous is an advantage. ASP formulation typically consists of about 0.5-1% alkali, 0.1% surfactant and 0.1% polymer. The alkaline component reacts with the acidic moieties that exist in the oil creating natural soap and also helps reduce the adsorption of the surfactant on the rock.

Borate crosslinked gel fracturing fluids utilize borate ions to crosslink the hydrated polymers and provide increased viscosity. The polymers most often used in these fluids are guar and HPG. The crosslink obtained by using borate is reversible and is triggered by altering the pH of the fluid system (increasing the pH generates the crosslink function, decreasing the pH eliminates the crosslink). The reversible characteristic of the crosslink in borate fluids helps them clean up more effectively, resulting in good regained permeability and conductivity.

Some of the major challenges faced in the oil & gas industry with respect to the use of conventional hydroxides include the following: high levels of corrosion on certain metals which are typically countered by the use of High Density Polyurethane (HDPE) components, intensive and expensive maintenance schedules—environment and equipment; reactions between hydroxides and various types of metals can vary greatly but with certain metals, such as aluminum, effects are substantial causing immediate damage. As caustics are utilized to control pH levels in many systems throughout the life cycle of a well, exposure to these metals can happen often resulting in substantial replacement costs. This renders typical hydroxide blends as controlled in most jurisdictions and require extensive labeling/handling and transportation procedures which can add to the end user's costs. Additionally, the high toxicity levels of hydroxides render them banned in many offshore operations due to concerns over unintentional release into sensitive ocean ecosystems.

Like other highly corrosive alkalis, sodium hydroxide solutions can decompose proteins and lipids in skin, eyes or other living tissues via amide hydrolysis and ester hydrolysis, which consequently causes chemical burns and may induce permanent blindness if it contacts eye tissue. Solid alkali may also express its corrosive nature if there is water present on the skin or in the eyes. Sodium hydroxide is corrosive to several metals, like aluminum which reacts with the alkali to produce flammable hydrogen gas on contact. Having an alternative that is much less corrosive to metals, has a far lower freeze point, has a linear pH control effect and provides a period of human dermal tissue protection is advantageous. Having one of those advantages is desirable, having more than one is even more so.

The inherent environmental effects (organic sterility, poisoning of wildlife etc.) of caustics in the event of an unintended/accidental release on surface or downhole into water aquifers or sources of water are devastating which can cause significant pH increase of such and can substantially increase the toxicity and could potentially cause a mass culling of aquatic species and potential poisoning of humans/livestock and wildlife exposed to/or drinking the water. An unintended release at surface can also cause damaging fumes to be released, potentially endangering human and animal health. This is a common event at large storage sites when tanks split or leak. Typically, if near the public, large areas need to be evacuated post event.

The inability for many caustics and blends of such to biodegrade naturally without irreversibly damaging the soil, results in expensive cleanup-reclamation costs for the operator should an unintended release occur. Moreover, the fumes produced by many bases are harmful to humans/animals and are highly corrosive and/or explosive potentially, transportation and storage requirements for liquid bases are restrictive and taxing in such that you must typically haul the products in tankers or intermediate bulk containers (IBC) that are rated to handle such corrosive-regulated products, creating exposure dangers for personnel having to handle them. Sodium hydroxide and its solutions, mists, and aerosols are rapidly damaging when they come in contact with the eyes, skin, and upper respiratory tract causing irritation, burns, coughing, chest pain and dyspnea. Swelling of the throat and accumulation of fluid in the lungs (shortness of breath, cyanosis, and expectoration) may occur. Ingestion of sodium hydroxide can cause severe corrosive injury to the lips, mouth, throat, esophagus, and stomach. There is no antidote to be administered to counteract the effects of sodium hydroxide. Treatment consists of supportive measures.

Price fluctuations with typical commodity caustics based on industrial output causing end users an inability to establish long term costs in their respective budgets; severe reaction with dermal/eye tissue; major PPE requirements (personal protective equipment) for handling, such as on site shower units; extremely high corrosion rates, the need for constant expensive heating of liquid solutions and the aggressive non-linear raising of pH are some of the negatives to the industry standard bases utilized, such as sodium hydroxide.

When used to control the pH levels on surface of water/fluid systems, caustics are exposed to humans and mechanical devices as well as expensive pumping equipment causing increased risk for the operator and corrosion effects that damage equipment and create hazardous hydrogen gas when they come into contact with water or aluminum. When mixed with acidic or lower pH fluids, caustics will create a large amount of thermal energy (exothermic reaction) causing potential safety concerns and equipment damage, caustics typically need to be blended with fresh water to the desired concentration requiring companies to sometimes pre-blend off-site as opposed to blending on-site, greatly thereby increasing costs associated with transportation.

Typical caustics used in a pH control situation can or will cause degradation of certain polymers/additives/systems/formations requiring further chemicals to be added to counter these potentially negative effects, many offshore areas of operations have very strict regulatory rules regarding the transportation/handling and deployment of caustics causing greatly increased liability and costs for the operator.

Caustics perform many actions in the oil & gas industry and are considered necessary to achieve the desired production of various petroleum wells, maintain their respective systems and aid in certain functions (i.e. suppressing calcium & magnesium in hard waters). The associated dangers that come with using caustics are expansive and tasking to mitigate through controls whether they are chemically or mechanically engineered.

Eliminating or even simply reducing the negative effects of caustics while maintaining their performance level is a struggle for the industry. As the public demand for the use of cleaner/safer/greener products increases, companies are looking for alternatives that perform the required function without all or most of the drawbacks associated with the use of caustics.

U.S. Pat. No. 7,073,519 discloses a facility parts cleaning composition for the processing of (meth)acrylic acid and/or (meth)acrylic esters comprising an alkali metal hydroxide solution, a water-soluble amino acid, N,N'-methylene bisacrylamide, and azobisisobutyronitrile, and a cleaning method using the cleaning solution composition. Disclosed are compositions including 5 to 50 wt % of at least one alkali metal hydroxide selected from the group consisting of sodium hydroxide and potassium hydroxide, 0.01 to 1 wt % of a water-soluble amino acid, 0.001 to 0.05 wt % of N,N'-methylene bisacrylamide, and 0.001 to 0.05 wt % of azobisisobutyronitrile.

U.S. Pat. No. 7,902,137 discloses alkaline concentrated detergent composition for use in cleaning hard surfaces, medical instruments and other metal components (parts, tools, utensils, vessels, equipment). The description states that an important aspect of the invention is the utilization of a synergistic system of chelants and scale inhibition components that are biodegradable. Chelation and scale inhibition are said to have a positive impact on cleaning performance of the compositions.

US Statutory Invention Registration no. H468 entitled "Alkaline hard-surface cleaners containing alkyl glycosides" discloses a cleaning composition comprising: (a) about 0.1 to 50 weight percent alkali metal hydroxide or ammonium hydroxide; (b) about 0.1 to 40 weight percent alkyl glycoside; and (c) about 10 to 95 weight percent water.

U.S. Pat. No. 9,399,589 B2 teaches the use of glycine in the making of a synthetic base that is said to obviate all the drawbacks of strong bases such as sodium hydroxide. It is stated that the compound is made by dissolving glycine in water and adding calcium hydroxide at a molar ratio of about 1:1. Sodium percarbonate is then dissolved in the solution to produce the new compound.

U.S. Pat. No. 6,387,864 discloses a laundry detergent composition comprising about 1 to about 75 parts by weight of at least one caustic compound, about 0.5 to about 50 parts by weight of at least one nonionic surfactant, about 1 to about 35 parts by weight of at least one primary amine compound.

U.S. Pat. No. 5,804,541 discloses a floor stripper composition is provided, having a pH-value above 9.0, and comprising a soap, water and a glycine-N,N-diacetic acid compound, which is preferably methylglycine diacetic acid (MGDA). The diacetic acid is desirably in the form of a divalent metal complex thereof. The description states that a good floor stripper performance could be obtained with this composition owing to its low foaming behaviour.

Since several operations in the oil industry expose fluids and equipment to very high temperatures (some upward of 200° C.), the caustic compositions used in these various operations need to withstand these high temperatures without losing their effectiveness. These compositions must be capable of being used in operations over a wide range of temperatures (even at very low temperatures below zero) while not affecting the equipment or people it comes in contact with.

Consequently, there is still a need for compositions for use in the oil industry which can be used over a range of applications which can decrease a number of the associated dangers/issues typically associated with caustic applications to the extent that these caustic compositions are considered much safer for handling on worksites. The present invention seeks to overcome some of drawbacks of the prior art caustic compositions and methods using such caustic compositions.

SUMMARY OF THE INVENTION

According to a first aspect of the present invention, there is provided a caustic composition comprising:
 a caustic component;
 an additive adapted to provide an extended (more methodical and linear) buffering effect to the caustic composition as well as greatly lowering the freeze point and providing an increased level of dermal protection; and
 water.

Preferably, the caustic component is selected from the group consisting of: potassium hydroxide; sodium hydroxide; lithium hydroxide; cesium hydroxide; rubidium hydroxide and combinations thereof. More preferably, the caustic component is selected from the group consisting of: potassium hydroxide; sodium hydroxide and combinations thereof. Preferably, the caustic component is present in a concentration of up to 40 wt % of the composition. More preferably, the caustic component is present in a concentration ranging from 5 to 40 wt % of the composition. Yet more preferably, the caustic component is present in a concentration ranging from 10 to 30 wt % of the composition. Yet even more preferably, the caustic component is present in a concentration ranging from 15 to 25 wt % of the composition. According to a preferred embodiment of the present invention, the caustic component is present in a concentration of approximately 25 wt % of the composition.

Preferably, the additive is selected from the group of amino acids consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine and salts thereof.

More preferably, the additive is selected from the group consisting of: Lysine monohydrochloride; threonine; and methionine. Preferably also, the additive is monosodium glutamate. Preferably, the additive is present in a concentration ranging from 2 wt % to 25 wt % of the composition. More preferably, the additive is present in a concentration ranging from 4 wt % to 15 wt % of the composition. Yet even more preferably, the additive is present in a concentration ranging from 4 wt % to 10 wt % of the composition.

According to another aspect of the present invention, there is provided a method of fracking a hydrocarbon-bearing formation using a crosslinked polymer gel, said method comprising the steps of:
 providing a hydrocarbon-bearing formation;
 providing a polymer;
 providing a cross-linking activator and adding such to the polymer;
 adding to the polymer mixture a caustic composition comprising:
  a caustic component;
  an additive adapted to provide an extended, more linear buffering effect to the caustic composition when such is exposed to the fluid system; and
  water;
 adding a proppant to the resulting polymer mixture; and
 injecting said resulting polymer-proppant composition into the formation.

Preferably, the crosslinking component is a borate ion or a zirconate ion. Preferably, the polymer is a guar gum, Carboxymethyl guar gum, Hydroxymethyl guar gum; Hydroxypropylethyl guar gum; O-carboxymethyl-O-hydroxypropyl guar gum (CMHPG); Ammonium hydroxyl propyl trimethyl chloride of guar gum; O-carboyxymethyl-O-2 hydroxy-3-(trimethylammonia propyl) guar gum (CMHTPG); Acryloyloxy guar gum; Methacryloyl guar gum; Guar gum esters such as Hydroxy Propyl Guar (HPG), Carboxy Methyl Guar (CMG), Carboxy Methyl Hydroxy Propyl Guar (CMHPG), and Guar.

According to another aspect of the present invention, there is provided a method of removing impurities present in petroleum during the refining thereof, said method comprising the steps of:
 providing a petroleum product to be refined;
 providing a caustic composition comprising:
  a caustic component;
  an additive adapted to provide an extended, more linear buffering effect to the caustic composition when such is exposed to acid; and
  water;
 adding said caustic composition to said petroleum product to be refined; and
 allowing said caustic composition and said petroleum product to be refined to remain in contact with one another for a period of time determine to be sufficient for the sufficient removal of at least one of carbon dioxide and sulfur-containing compounds.

According to another aspect of the present invention, there is provided a use of the composition according to a preferred embodiment of the present invention, for the control the pH of water based drilling fluids.

According to another aspect of the present invention, there is provided a use of the composition according to a preferred embodiment of the present invention, for the breaking down of organic matter present in petroleum during the refining thereof.

According to another aspect of the present invention, there is provided a use of the composition according to a preferred embodiment of the present invention, for the removal of various impurities during the refining stage of petroleum production. Preferably, the impurities are selected from the group consisting of: include: carbon dioxide and sulfur-containing compounds.

According to another aspect of the present invention, there is provided an aqueous caustic composition comprising:
 a caustic component;
 an amino acid additive adapted to provide an extended buffering effect to the caustic composition when such is exposed to an acid; and
 water;
wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine and salts thereof, and wherein the caustic component is present in a concentration of up to 40 wt % of the composition and the caustic component and the additive are present in a molar ratio ranging from 15:1 to 5:1. Preferably, the caustic component and the additive are present in a molar ratio ranging from 12:1 to 8:1. Preferably also, the caustic component comprises an hydroxide anion and a monovalent cation. Preferably, the monovalent cation is selected from the group consisting of: potassium, sodium, lithium, cesium and rubidium. More preferably, the cation is selected from the group consisting of: potassium and sodium.

According to another aspect of the present invention, there is provided a use of a buffered caustic solution in water treatment, wherein said buffered caustic solution comprising:
    a caustic component;
    an amino acid additive adapted to provide an extended buffering effect to the caustic composition when such is exposed to an acid; and
    water;
    wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine and salts thereof, wherein the caustic component is present in a concentration of up to 40 wt % of the composition and the caustic component and the additive are present in a molar ratio ranging from 15:1 to 5:1.

According to another aspect of the present invention, there is provided a method to treat water, wherein said method comprises the steps of:
    providing an aqueous caustic composition comprising:
        a caustic component;
        an amino acid additive adapted to provide an extended buffering effect to the caustic composition when such is exposed to an acid; and
        water;
    wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine and salts thereof, wherein the caustic component is present in a concentration of up to 40 wt % of the composition and wherein the caustic component and the additive are present in a molar ratio ranging from 15:1 to 5:1; and
    exposing a water requiring treatment to a pre-determined amount of said caustic composition for a period of time sufficient to effect the treatment intended.

BRIEF DESCRIPTION OF THE FIGURES

The invention may be more completely understood in consideration of the following description of various embodiments of the invention in connection with the accompanying figures, in which.

DESCRIPTION OF AN EMBODIMENT OF THE PRESENT INVENTION

Figure 1:
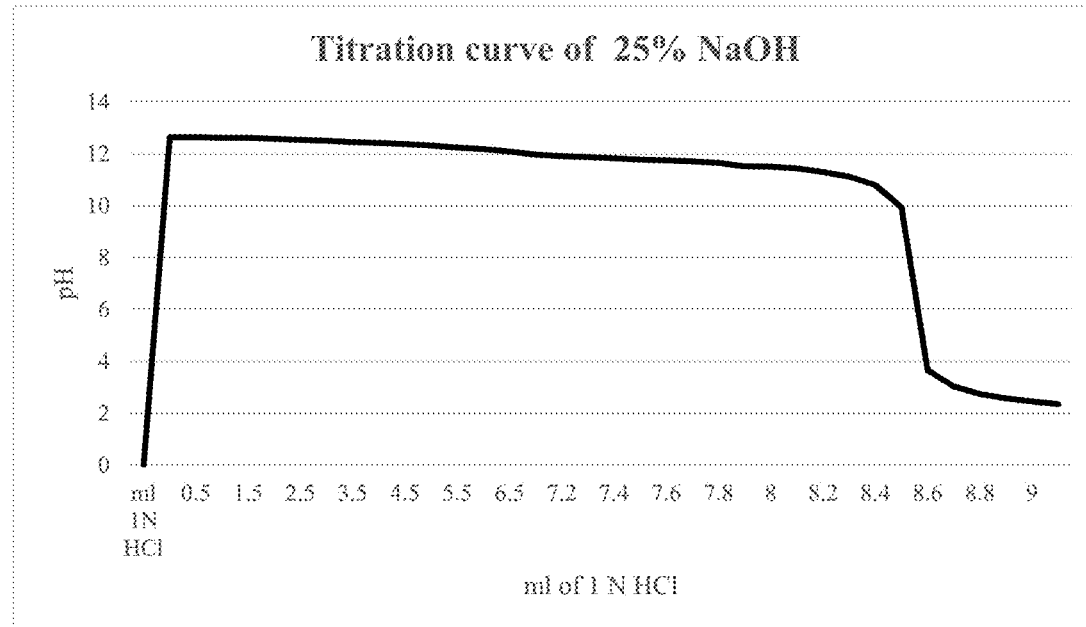
FIG. 1 depicts a titration curve of a composition of NaOH (25 wt %)
Figure 2:
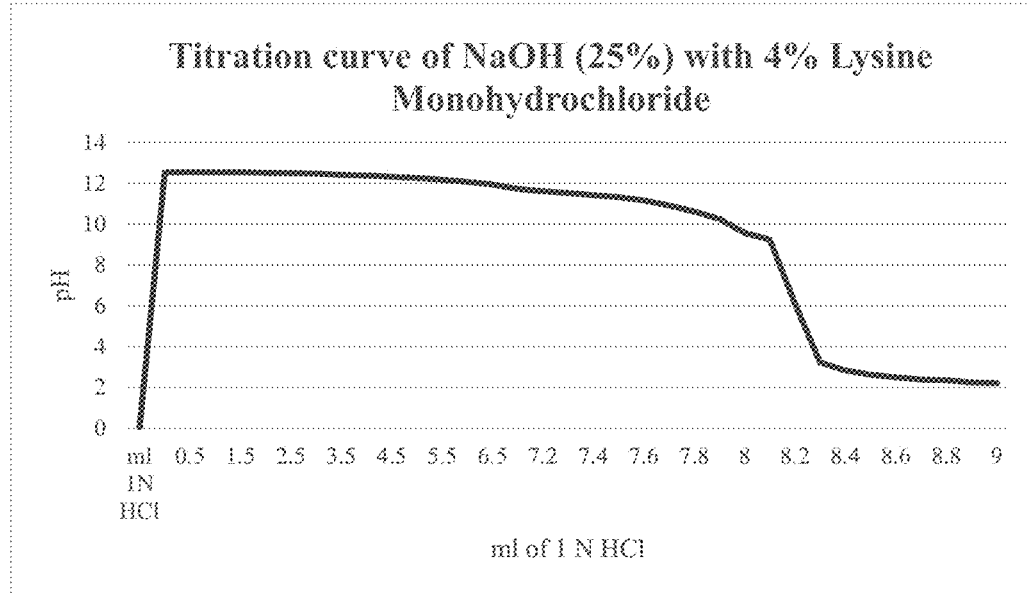
FIG. 2 depicts a titration curve of a composition according to a preferred embodiment of the present invention, said composition comprising NaOH (25 wt %) with 4 wt % lysine monohydrochloride.
Figure 3:
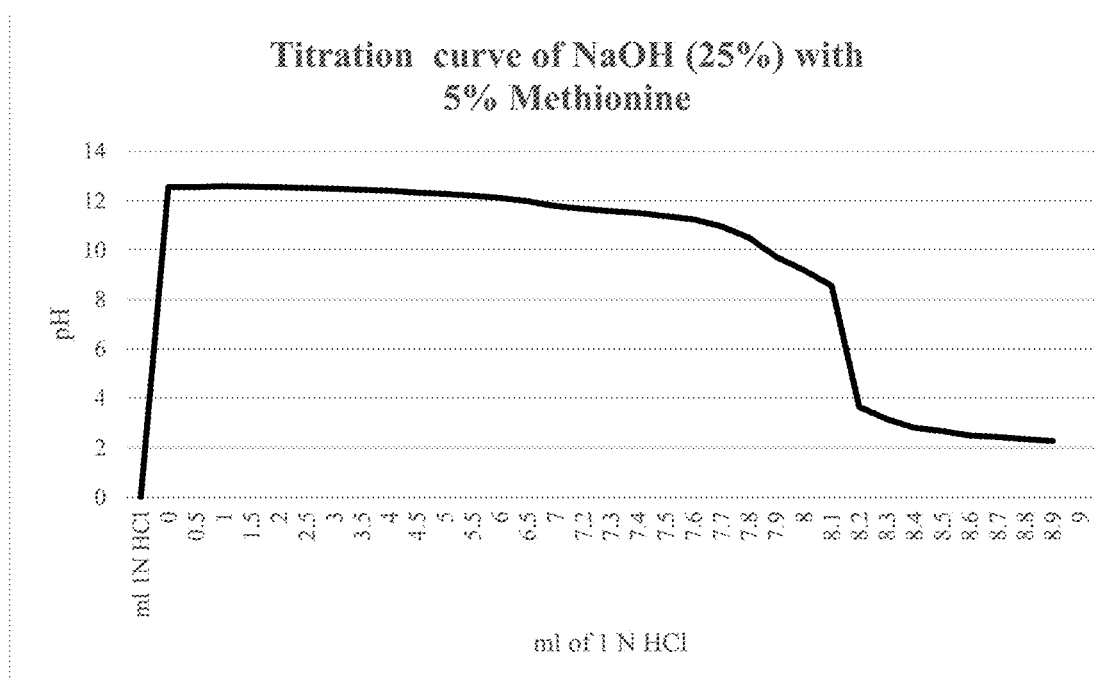
FIG. 3 depicts a titration curve of a composition according to a preferred embodiment of the present invention, said composition comprising NaOH (25 wt %) and 5 wt % methionine.
Figure 4:
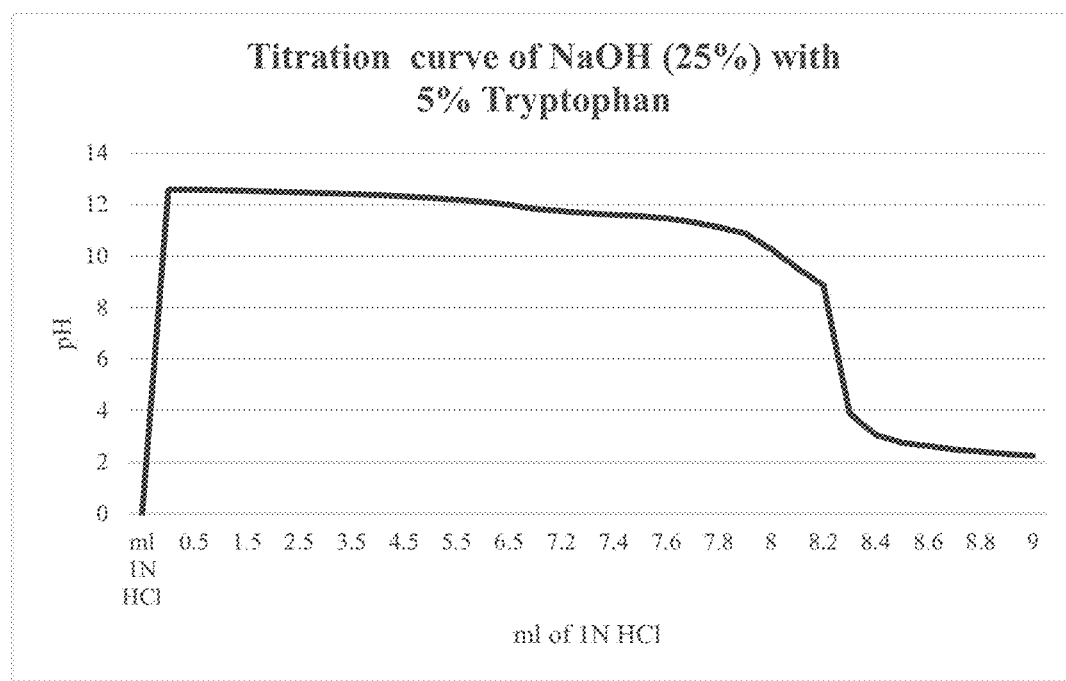
FIG. 4 depicts a titration curve of a composition according to a preferred embodiment of the present invention, said composition comprising NaOH (25 wt %) and 5 wt % tryptophan.
Figure 5:
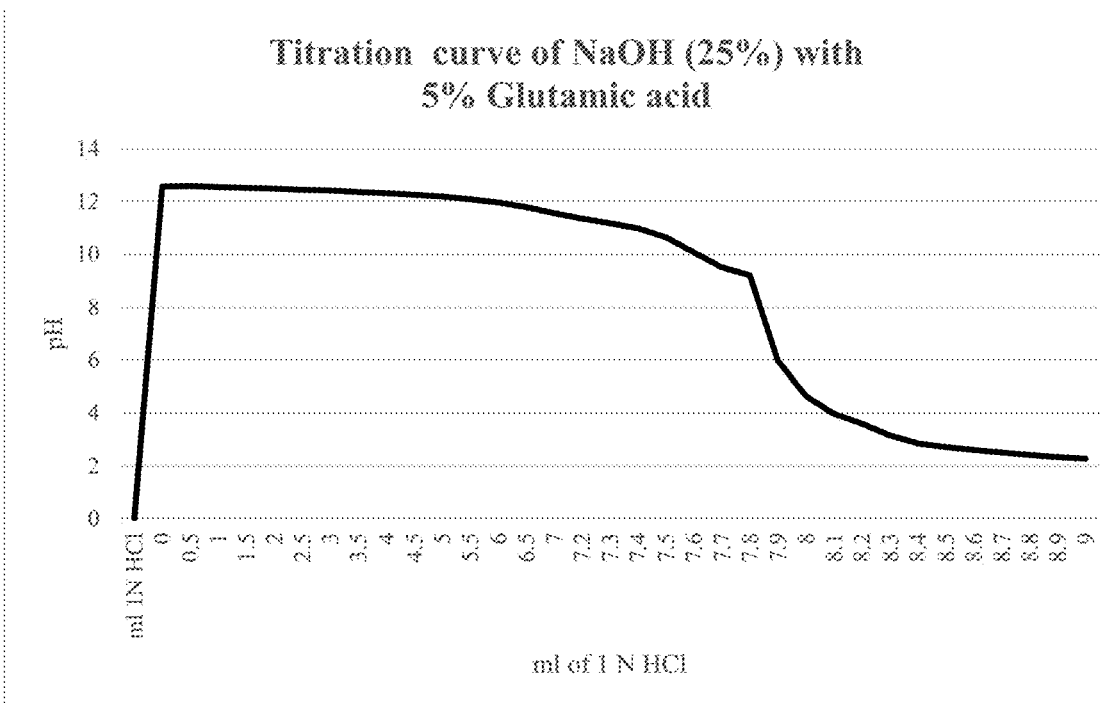
FIG. 5 depicts a titration curve of a composition according to a preferred embodiment of the present invention, said composition comprising NaOH (25 wt %) and 5 wt % glutamic acid.
Figure 6:
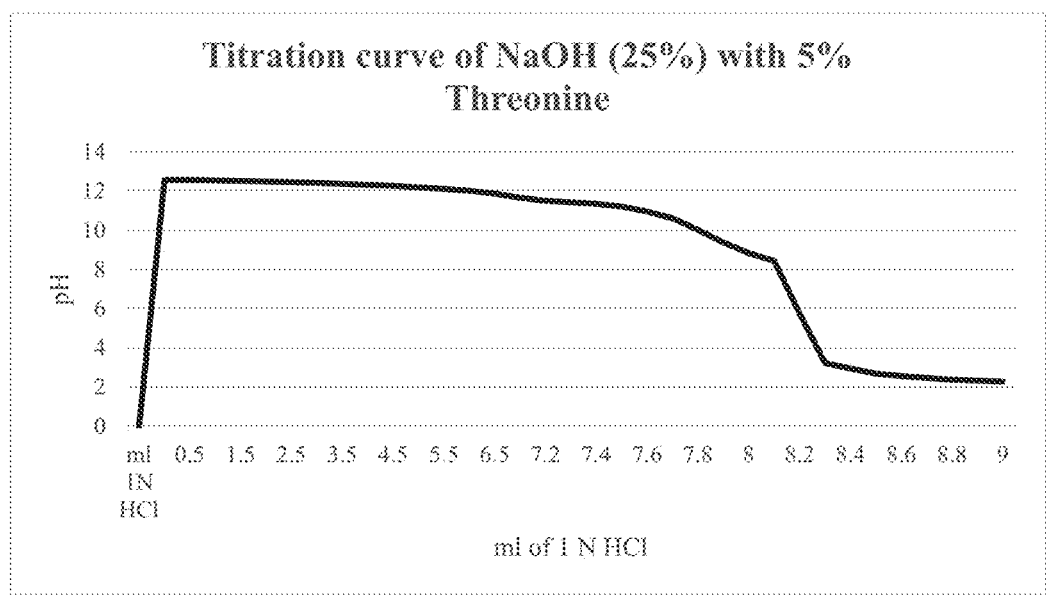
FIG. 6 depicts a titration curve of a composition comprising NaOH (25 wt %) and 5 wt % threonine.

Borate crosslinked gel fracturing fluids utilize borate ions to crosslink the hydrated polymers and provide increased viscosity. The polymers most often used in these fluids are guar and HPG. The crosslink obtained by using borate is reversible and is triggered by altering the pH of the fluid system (increasing the pH generates the crosslink function, decreasing the pH eliminates the crosslink). The reversible characteristic of the crosslink in borate fluids helps them clean up more effectively, resulting in good regained permeability and conductivity. The present invention can be utilized in this type of situation all the while having a minimal negative effect on polymer chains. The latter is yet another advantage of a preferred embodiment of the present invention. Borate crosslinked fluids have proved to be highly effective in both low and high permeability formations.

To achieve an optimal crosslinking of borate crosslinked guar gel, a pH between 8.5 and 9.0 is necessary. This is a very narrow pH window. A common drawback of using neat caustic is that, as a strong base, a pH in that range can be quite difficult to adjust. A slight difference in dosage can result in a high pH shift, this results in the breakdown of the crosslinking in the gel.

In an attempt to overcome the drawback of using strong caustic agents in the presence of crosslinked gels, or at least to compensate and create a buffer which allows some flexibility in the dosage, a crosslinker and guar gum is added on location on the fly with special equipment.

According to a preferred embodiment of the present invention, it is desirable to have a buffered caustic solution, which enables one to adjust the pH more precisely in a desired range (in other words it is more forgivable in terms of overdosage). Such a buffer provides a substantial advantage over the use of a neat caustic composition.

According to another preferred embodiment of the present invention, it is desirable to have a buffered caustic solution in water treatment. Caustics such as sodium hydroxide can be used to raise the pH of water supplies. Increased pH renders the water less susceptible to corrode pipes and reduces the amount of free metals including copper and other metals which can be found in drinking water.

According to a preferred embodiment of the present invention, there is provided a method to treat water, wherein said method comprises the steps of:
providing an aqueous caustic composition comprising:
a caustic component;
an amino acid additive adapted to provide an extended buffering effect to the caustic composition when such is exposed to an acid; and
water;
wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine and salts thereof, and wherein the caustic component is present in a concentration of up to 40 wt % of the composition and the caustic component and the amino acid additive are present in a molar ratio ranging from 15:1 to 5:1; and
exposing a water requiring treatment to a pre-determined amount of said caustic composition for a period of time sufficient to effect the treatment intended.

Example 1

Preparation of a Caustic Composition According to a Preferred Embodiment

A composition according to a preferred embodiment of the present invention was prepared by providing 100 ml of 25 wt % NaOH solution. The NaOH solution is then mixed with the appropriate weight of additive, in this case, lysine to be present in an amount of 5 wt %, to obtain the desired weight % concentration. The resulting composition is mixed until one visually determines that solubilization is completed.

Titration of the Composition

Figure 7:
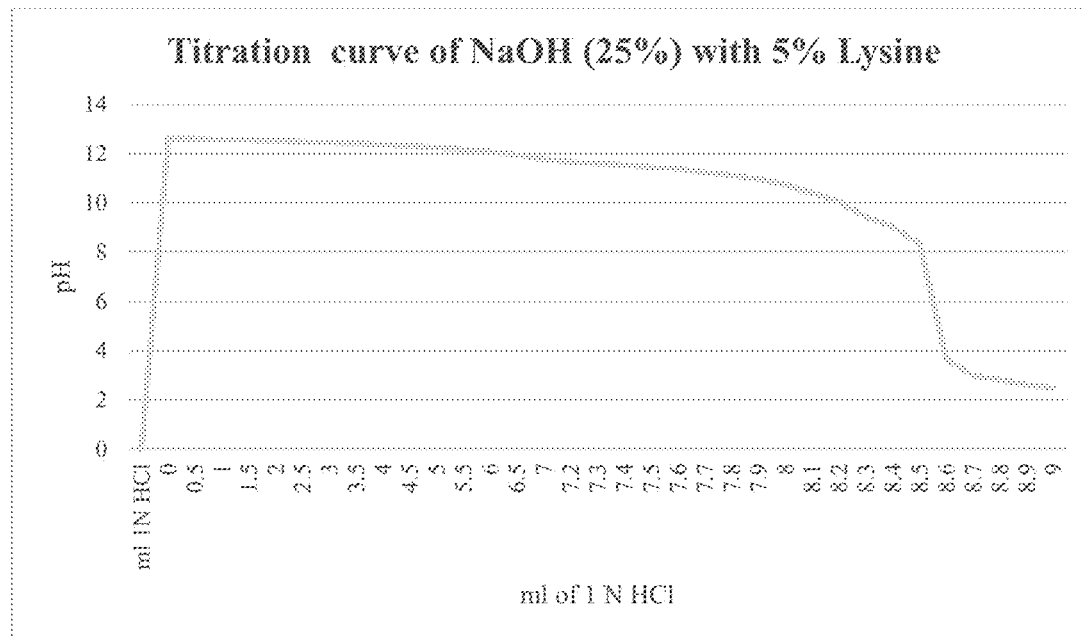
FIG. 7 depicts a titration curve of a composition according to a preferred embodiment of the present invention, said composition comprising NaOH (25 wt %) and 5 wt % lysine.
Figure 8:
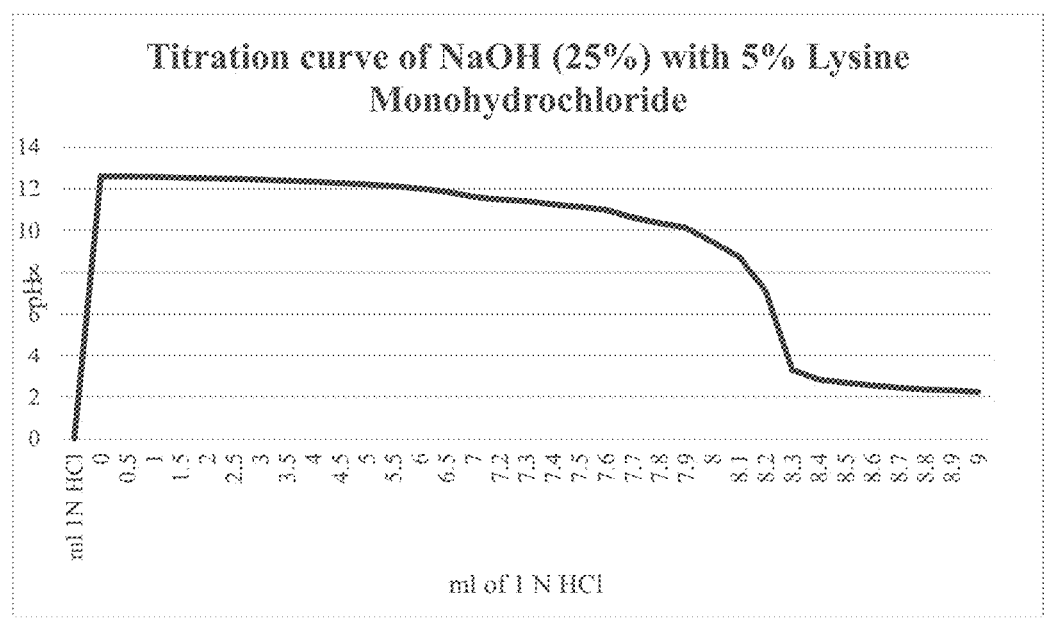
FIG. 8 depicts a titration curve of a composition according to a preferred embodiment of the present invention, said composition comprising NaOH (25 wt %) and 5 wt % lysine monohydrochloride.
Figure 9:
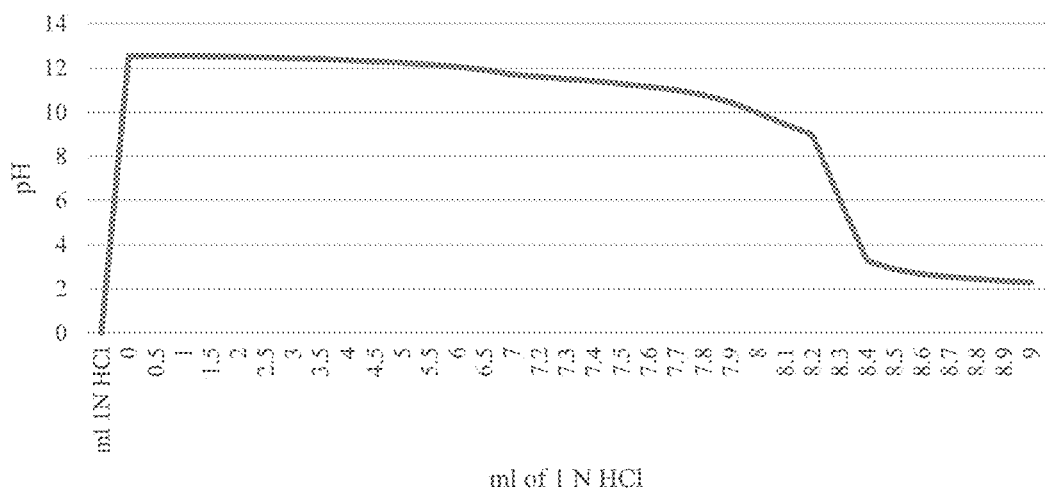
FIG. 9 depicts a titration curve of a composition according to a preferred embodiment of the present invention, said composition comprising NaOH (25 wt %) and 5 wt % lysine monohydrochloride.
Figure 10:
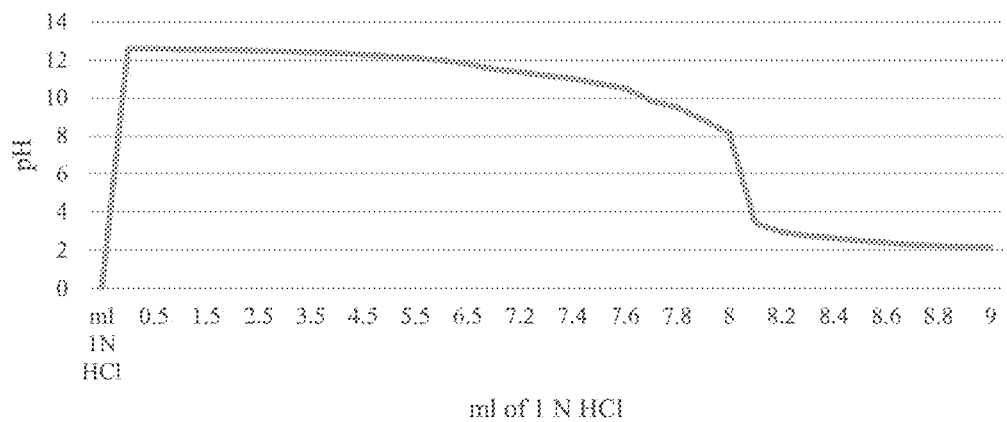
FIG. 10 depicts a titration curve of a composition according to a preferred embodiment of the present invention, said composition comprising NaOH (25 wt %) and 4 wt % lysine monohydrochloride USP.
Figure 11:
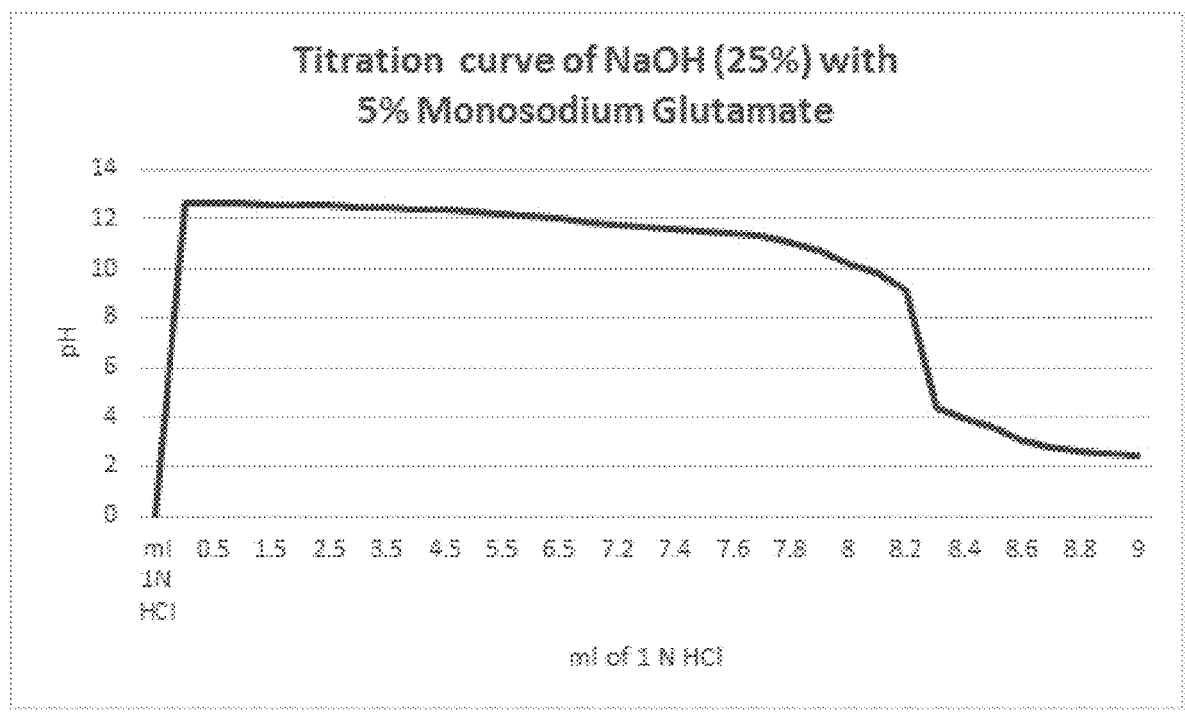
FIG. 11 depicts a titration curve of a composition according to a preferred embodiment of the present invention, said composition comprising NaOH (25 wt %) and 5 wt % monosodium glutamate.

The titration of the composition of Example 1 was performed in order to assess its buffering ability. In order to do so, 1 ml of the buffer (composition of Example 1) was drawn and placed in a flask, the buffer was then diluted in 100 ml of distilled water. The resulting solution was titrated with 1 N HCl standard. The pH was continuously recorded with a pH meter. The solution was gently stirred with a magnetic stir bar during the measurements. Prior to recording the pH after each addition of HCl, sufficient time was given to allow for the pH to stabilize. The resulting titration curve associated with Example 1 is found in FIG. 7.

As can be seen by referring to FIGS. 1 to 11, preferred embodiments of the present invention (set out in FIGS. 2 to 11) displayed an extended/linear buffering effect when exposed to acid addition as compared to caustic composition free of additive. This advantageous buffering effect translates into an increased ability to control the pH of cross-linked gels during fracking operations. This is even more advantageous when the pH adjustment is done on the fly.

Preferred compositions of the present invention display a strong caustic character, extended linear buffering effect (compared to neat caustic), greatly reduced freeze point and minimized dermal damage upon direct contact with human skin.

According to a preferred embodiment of the present invention, certain additives such as lysine monohydrochloride, and threonine can buffer the pH drop of a 25 wt % caustic solution in the pH range of 8.25 to 10. Such a buffering effect is desirable in fracking operations to maintain the integrity of a guar gel based polymeric system.

According to a preferred embodiment of the present invention, a caustic composition comprising lysine-HCl as additive can have a freezing point as low as −45° C. This is a substantial decrease in the freeze point compared to −18° C. for 25 wt % NaOH. This proves to be highly desirable for winter operations in the oil and gas industry.

Dermal Test

Human dermal tests were performed to assess the safety of inadvertent exposure to a composition according to a preferred embodiment of the present invention.

The tests have determined that human skin having an extended exposure time between 20 to 30 minutes showed minimal signs of damage (i.e. skin irritation) from direct exposure of the composition. This stands in stark contrast with pure NaOH (25%) which, when dropped on the skin causes immediate burning of the skin, followed with scarring.

According to a preferred embodiment, it is desirable to use REACH-ECHA approved products such as lysine and methionine. To have REACH-ECHA approved components provides more opportunities to apply the present technology all the while improving recovery and minimizing environmental damage.

According to another application of the composition according to the preferred embodiment of the present invention, a hot solution of the caustic composition according to a preferred embodiment of the present invention can be used to dissolve aluminium-containing minerals in the bauxite. This, as a result, forms a supersaturated solution of sodium aluminate. When the solution is cooled it will yield a solid form of sodium aluminate. This sodium aluminate can be employed in water treatment, in construction to accelerate the solidification of concrete, in the paper industry, to make fire bricks production, to manufacture alumina.

According to another preferred embodiment of the present invention, it is desirable to have a buffered caustic solution in water treatment. Caustics such as sodium hydroxide can be used to raise the pH of water supplies. Increased pH renders the water less susceptible to corrode pipes and reduces the amount of free metals including copper and other metals which can be found in drinking water.

According to a preferred embodiment of the present invention, there is provided a method of fracking a hydrocarbon-bearing formation using a cross-linked polymer gel, said method comprising the steps of:
providing a hydrocarbon-bearing formation;
providing a polymer;
providing a cross-linking activator and adding such to the polymer;
adding to the polymer mixture a caustic composition comprising:
a caustic component;
an amino acid additive adapted to provide an extended buffering effect to the caustic composition when such is exposed to an acid; and
water;

wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine and salts thereof, adding a proppant to the resulting polymer mixture; and injecting said resulting polymer-proppant composition into the formation. Preferably, the caustic component is present in amount of up to 40 wt % of the composition. Preferably, the crosslinking component is selected from the group consisting of: a borate ion and a zirconate ion. Preferably also, the polymer is a guar gum.

According to a preferred embodiment of the present invention, there is provided a method of removing impurities present in petroleum during the refining thereof, said method comprising the steps of:

providing a petroleum product to be refined;

providing a caustic composition comprising:
  a caustic component;
  an amino acid additive adapted to provide an extended buffering effect to the caustic composition when such is exposed to an acid; and
  water;
  wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine and salts thereof, adding said caustic composition to said petroleum product to be refined; and allowing said caustic composition and petroleum product to be refined to remain in contact with one another for a period of time determine to be sufficient for the sufficient removal of at least one of carbon dioxide and sulfur-containing compounds.

According to a preferred embodiment of the present invention, there is provided a use of the caustic composition for the control of pH of drilling fluids.

According to a preferred embodiment of the present invention, there is provided a use of the caustic composition for the breaking down of organic matter present in petroleum during the refining thereof.

According to a preferred embodiment of the present invention, there is provided a use of the caustic composition for the removal of various impurities during the refining stage of petroleum production. Preferably, the impurities are selected from the group consisting of: include: carbon dioxide and sulfur-containing compounds.

According to a preferred embodiment of the present invention, there is provided an aqueous caustic composition comprising:

a caustic component;

an amino acid additive adapted to provide an extended buffering effect to the caustic composition when such is exposed to an acid; and water;

wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine and salts thereof, and wherein the caustic component is present in a concentration of up to 40 wt % of the composition and the caustic component and the additive are present in a molar ratio ranging from 15:1 to 5:1. Preferably, the caustic component and the additive are present in a molar ratio ranging from 12:1 to 8:1. Preferably, the caustic component comprises an hydroxide anion and a monovalent cation.

According to a preferred embodiment of the present invention, there is provided a use of a buffered caustic solution in water treatment, wherein said buffered caustic solution comprising:

a caustic component;

an additive adapted to provide an extended buffering effect to the caustic composition when such is exposed to acid; and water;

wherein the caustic component is present in a concentration of up to 40 wt % of the composition and the caustic component and the additive are present in a molar ratio ranging from 15:1 to 5:1.

According to a preferred embodiment of the present invention, there is provided a method to treat water, wherein said method comprises the steps of:

providing an aqueous caustic composition comprising:
  a caustic component;
  an amino acid additive adapted to provide an extended buffering effect to the caustic composition when such is exposed to an acid; and
  water;
wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine and salts thereof;
wherein the caustic component is present in a concentration of up to 40 wt % of the composition and the caustic component and the additive are present in a molar ratio ranging from 15:1 to 5:1; and exposing a water requiring treatment to a pre-determined amount of said caustic composition for a period of time sufficient to effect the treatment intended.

According to a preferred embodiment of the present invention, there is provided a method for treating mine water from an ore deposit, wherein the mine water contains sodium carbonate and sodium bicarbonate, the method comprising:

pumping the mine water from the ore deposit;

introducing a tailings stream comprising an amount of the composition according to the present invention into the mine water to form a reaction solution;

maintaining a pH of between about 11.5 and about 13 in the reaction solution;

separating a treated mine water from the reaction solution to form a concentrate;

introducing the treated mine water into an alkali production process.

Although a few embodiments have been shown and described, it will be appreciated to those skilled in the art that various changes and modifications can be made to the embodiments described herein. The terms and expressions used in the above description have been used herein as terms of description and not of limitation, and there is no intention in the use of such terms and expressions of excluding equivalents of the features shown and described or portions thereof, it being recognized that the invention is defined and limited only by the claims that follow.

The invention claimed is:

1. An aqueous caustic composition comprising:
a caustic component present in a concentration ranging from 5 wt % to 40 wt % of the aqueous caustic composition;
an amino acid additive present in a concentration ranging from 2 wt % to 25 wt % of the aqueous caustic composition, wherein the amino acid additive is adapted to provide an extended buffering effect to the aqueous caustic composition when such is exposed to an acid; and
water;
wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine; and salts thereof, and
wherein the amino acid additive buffers a pH of the aqueous caustic composition between 8.25 and 10.

2. The aqueous caustic composition according to claim 1, wherein the caustic component is selected from the group consisting of: potassium hydroxide; sodium hydroxide; and combinations thereof.

3. The aqueous caustic composition according to claim 1, wherein the amino acid additive is selected from the group consisting of: lysine monohydrochloride; threonine; and methionine.

4. The aqueous caustic composition according to claim 1, wherein the caustic component is present in a concentration ranging from 10 wt% to 30 wt % of the aqueous caustic composition.

5. The aqueous caustic composition according to claim 1, wherein the caustic component is present in a concentration ranging from 15 wt% to 25 wt % of the aqueous caustic composition.

6. The aqueous caustic composition according to claim 1, wherein the caustic component is present in a concentration of approximately 25 wt % of the aqueous caustic composition.

7. The aqueous caustic composition according to claim 1, wherein the amino acid additive is present in a concentration ranging from 4 wt % to 15 wt % of the aqueous caustic composition.

8. The aqueous caustic composition according to claim 1, wherein the amino acid additive is present in a concentration ranging from 4 wt % to 10 wt % of the aqueous caustic composition.

9. The aqueous caustic composition according to claim 1, wherein the aqueous caustic composition has a freezing point of less than −18° C.

10. The aqueous caustic composition according to claim 1, wherein the amino acid additive is lysine monohydrochloride and wherein the aqueous caustic composition has a freezing point of about −45° C.

11. The aqueous caustic composition according to claim 1, where the caustic component and the amino acid additive are present in a molar ratio ranging from 15:1 to 5:1.

12. The aqueous caustic composition according to claim 1, wherein the amino acid additive is selected from the group consisting of lysine monohydrochloride, threonine, and methionine, wherein the caustic component is one or more of potassium hydroxide and sodium hydroxide.

13. A fracturing fluid comprising a crosslinked polymer and the aqueous caustic composition according to claim 1.

14. The fracturing fluid according to claim 13, wherein the crosslinked polymer is a borate or zirconate crosslinked guar gum polymer.

15. The fracturing fluid according to claim 13, wherein the crosslinked polymer comprises a polymer selected from the group consisting of a guar gum, a carboxymethyl guar gum, a hydroxymethyl guar gum, a hydroxypropylethyl guar gum, an o-carboxymethyl-o-hydroxypropyl guar gum, an ammonium hydroxyl propyl trimethyl chloride of guar gum, an o-carboyxymethyl-o-2 hydroxy-3-(trimethylammonia propyl) guar gum, an acryloyloxy guar gum, a methacryloyl guar gum, a hydroxy propyl guar, a carboxy methyl guar, a carboxy methyl hydroxy propyl guar, and guar.

16. An aqueous caustic composition comprising:
a caustic component;
an amino acid additive adapted to provide an extended buffering effect to the aqueous caustic composition when such is exposed to an acid, wherein the amino acid additive buffers a pH of the aqueous caustic composition between 8.25 and 10; and
water;
wherein the amino acid additive is selected from the group consisting of: alanine; arginine; asparagine; aspartic acid; cysteine; glutamic acid; glutamine; histidine; isoleucine; leucine; lysine; methionine; phenylalanine; proline; serine; threonine; tryptophan; tyrosine; valine; and salts thereof, and
wherein the caustic component is present in a concentration of up to 40 wt % of the aqueous caustic composition and the caustic component and the amino acid additive are present in a molar ratio ranging from 15:1 to 5:1.

17. The aqueous caustic composition according to claim 16, where the caustic component and the amino acid additive are present in a molar ratio ranging from 12:1 to 8:1.

18. The aqueous caustic composition according to claim 16, wherein the caustic component comprises hydroxide anion and a monovalent cation.

19. The aqueous caustic composition according to claim 16, wherein the aqueous caustic composition has a freezing point of less than −18° C.

20. The aqueous caustic composition according to claim 16, wherein the amino acid additive is selected from the group consisting of lysine monohydrochloride, threonine, and methionine, wherein the caustic component is one or more of potassium hydroxide and sodium hydroxide.

* * * * *